Figure 1:
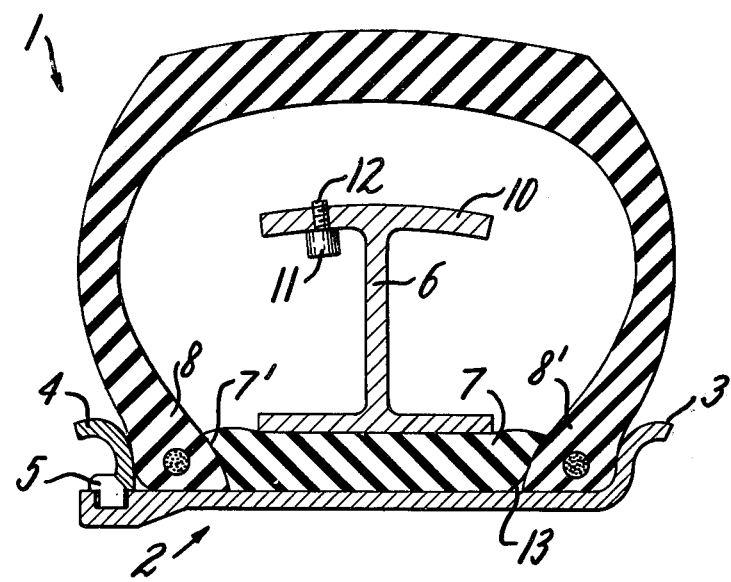

United States Patent [19]

Boileau

[11] 4,197,892
[45] Apr. 15, 1980

[54] SUPPORT RING ASSEMBLY FOR TIRES

[75] Inventor: Jacques Boileau, Clermont-Ferrand, France

[73] Assignee: Compagnie Generale des Etablissements Michelin, Clermont-Ferrand, France

[21] Appl. No.: 910,761

[22] Filed: May 30, 1978

[30] Foreign Application Priority Data

Jun. 10, 1977 [FR] France .................. 77 18123

[51] Int. Cl.² ........................................... B60C 17/04
[52] U.S. Cl. ............................... 152/158; 152/330 RF
[58] Field of Search .............. 152/158, 9, 81, 152, 152/330 RF, 330 L

[56] References Cited

U.S. PATENT DOCUMENTS

| 2,308,959 | 1/1943 | Brink | 152/158 |
| 2,563,788 | 8/1951 | Keefe | 152/158 |
| 3,990,491 | 11/1976 | Hampshire et al. | 152/158 |
| 4,091,854 | 5/1978 | French et al. | 152/158 |

Primary Examiner—Richard A. Bertsch
Attorney, Agent, or Firm—Brumbaugh, Graves, Donohue & Raymond

[57] ABSTRACT

Support ring assembly for tires comprising a rigid ring of I-shaped cross-section having an outer diameter less than the inner diameter of the tire tread when the tire is under load and having an inner diameter greater than the outer diameter of the cylindrical wheel rim is improved due to the fact that the assembly further comprises at least one solid annular part of elastic material which is mountable between the rim and the rigid ring, the annular part having an outer diameter substantially equal to the inner diameter of the rigid ring and having an inner diameter and width such that after the tire has been mounted on the rim, the fastening of the assembly on the rim is assured by compression of the elastic material of the annular part.

6 Claims, 3 Drawing Figures

SUPPORT RING ASSEMBLY FOR TIRES

The object of this invention is a support ring assembly for tires of the tubeless type in the event of loss of inflation pressure when traveling; it applies to tires mounted on a cylindrical rim of a wheel and is of particular interest in the case of subway cars.

The drawbacks and dangers of accidental losses of inflation pressure in tires are known. Numerous solutions have already been proposed, in particular support ring assemblies which are mounted on the rim, within the tire cavity, and against which the inner portion of the tread of the tire comes to rest in case of collapse due to a loss of inflation pressure.

In the case of wheels with cylindrical rims, mention may be made, for instance, of the published West German Patent Application No. 1,605,534; however, the known systems generally require modifications of the existing wheels and a complicated and therefore lengthy and expensive mounting.

The support ring assembly which forms the object of this invention overcomes these drawbacks by the possibility of employing it on normal wheels and by great simplicity of manufacture and mounting.

In accordance with the invention, this support ring assembly, which comprises a rigid ring having an outer diameter less than the inner diameter of the tire tread when the tire is under load and having an inner diameter greater than the outer diameter of the cylindrical wheel rim, is characterized by the fact that said assembly further comprises at least one solid annular part of elastic material which is mountable between the rim and the rigid ring, the annular part having an outer diameter substantially equal to the inner diameter of the rigid ring and having an inner diameter and width such that after the tire has been mounted on the rim, the fastening of said assembly on the rim is assured by compression of the elastic material of the annular part.

In particular, the elastic annular part may have an inner diameter slightly less than the outer diameter of the cylindrical wheel rim, or else a width greater than the distance between the two beads of the tire after the tire has been mounted on the rim.

Figure 2:
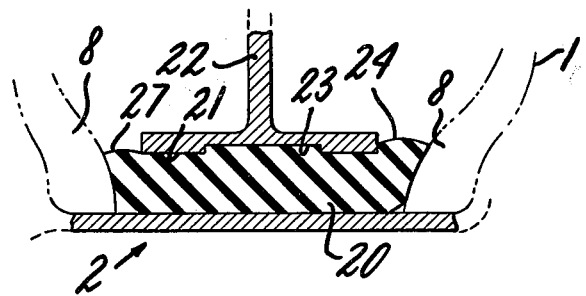
Figure 3:
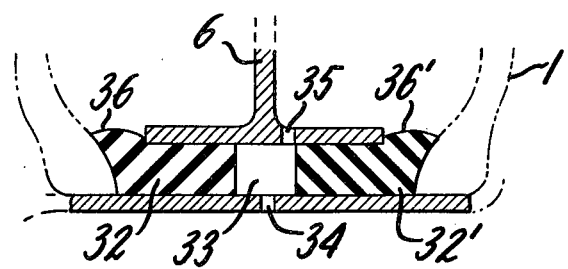

The invention will be better understood from a description of a few examples, given by way of illustration and not of limitation, with reference to the accompanying drawing in which FIGS. 1 to 3 are schematic cross-sectional views through various embodiments of a support ring assembly in accordance with the invention, the corresponding parts of these different figures bearing identical reference numbers.

FIG. 1 shows a tire 1 mounted on a normal cylindrical wheel rim 2 comprising, in known manner, a fixed flange 3, a removable flange 4, and a split locking ring 5.

The support ring assembly in accordance with the invention comprises a rigid ring 6, for instance, of steel, and a solid annular part 7 of elastic material, for instance, rubber. This elastic annular part 7 has an inner diameter which is slightly less than the outer diameter of the rim 2; it is compressed between the rim 2, the rigid ring 6, and beads 8, 8' of the tire 1.

The elastic annular part 7 has substantially frustoconical side faces 7' so as to better apply itself against the inner face of the beads 8, 8'.

In known manner, the rigid ring 6 has, for instance, an I-shaped radial cross-section, the outer diameter of which is less than the inner diameter of the tread of the tire 1 during its normal deformations; the outer part 10 of the rigid ring 6 is curved to fit the shape of the tire 1 when the latter is deflated and rests on the rigid ring 6.

The extensive rubbing which then occurs can be reduced by a lubricant which is liberated in due time; for example, in known manner, this lubricant may be contained in capsules 11 fastened in the rigid ring 6 and the ends 12 of which protrude slightly from the resting surface 10 and are broken by the rubbing of the tire 1 against the same.

The mounting of the support ring assembly which has just been described is effected in the following manner: the elastic annular part 7 is placed on the rigid ring 6 whereupon the resulting assembly is introduced into the cavity of the tire 1 by ovalizing a bead 8 or 8'. If the dimensions of the various parts do not make it possible to proceed in this manner, the rigid ring 6 may be made in several sections which are assembled arond the elastic annular part 7 within the cavity of the tire 1.

The first bead 8' is then placed on the rim 2; thereupon the elastic annular part 7 is placed against the edge of the rim 2, the second bead 8 is pressed against the elastic annular part 7 and, by means of a suitable press, the assembly is force-fitted on the rim 2. This operation is facilitated by a slight beveling of the circular edge 13 of the elastic annular part 7. Finally the removable flange 4 is attached, as well as the split locking ring 5. The elastic annular part 7 assures two functions; it holds the bead 8, 8' in place in case of a drop in inflation pressure within the tire 1 and, in accordance with the invention, it locks the rigid ring 6 in position, preventing it from slipping due to the compressing of the rubber by the rim 2.

FIG. 2 shows several variants of the invention which can be used separately or simultaneously. First of all, the elastic annular part 20 is compressed due to the fact that its width in free condition is greater than the distance between the two beads 8 of the tire 1 after it has been placed on the rim 2. Furthermore, it can be seen that the inner cylindrical surface 21 of the rigid ring 22 has a circumferential groove 23 in which the elastic annular part 20 engages under the effect of its compression; this variant prevents transverse displacements of the rigid ring 22 due to the anchoring of the elastic annular part 20 in the circumferential groove 23. Finally, the outer diameter of the elastic annular part 20 is enlarged in the side portion 24 which is located laterally beyond the rigid ring 22; this has the effect of facilitating the precise centering of the rigid ring 22 on the elastic annular part 20 upon the mounting of the one on the other. One could also provide an enlarged outer diameter on the other side portion 27, symmetric to the side portion 24 with respect to the equatorial plane of the tire 1.

FIG. 3 shows another variant of the invention which consists in making the elastic annular part in two similar portions 32 and 32' mounted one alongside of the other with the provisions of a circular cavity 33 between them. This arrangement avoids having to effect a precise positioning of an orifice drilled in the elastic annular part 7 (FIG. 1) or 20 (FIG. 2), when it consists of a single part, opposite the valve hole 34, since the latter necessarily opens into the circular cavity 33; of course, it is necessary in any event to provide another hole 35 in the base of the rigid ring 6 in order to be able to place the valve (not shown) and the inside of the tire 1 in communication with each other. In this variant, it is of particular interest to provide the two enlarged outer diameters in the side portions 36 and 36' of the similar elastic annular parts 32 and 32'.

As can be noted, the invention affords several advantages, namely the possibility of using it on existing standard wheels without any prior change, a substantial gain due to its simplicity of manufacture and mounting, and therefore a savng with respect to the entire arrangement.

Finally, the invention is of particular interest in the case of subway wheels, since it makes it possible to eliminate the emergency track ordinarily formed of metal rails which become bearing rails only upon accidental loss of pressure in the tires.

It goes without saying that the invention is not limited to the embodiments which have been described by way of example, but rather covers all variants. Thus, for instance, the cross-section ofthe rigid ring 6 may be of a shape different from the I-shape which has been described and shown in the drawing.

What is claimed is:

1. Support ring assembly for tubeless tires comprising a rigid ring having an outer diameter less than the inner diameter of the tire tread when the tire is under load and having an inner diameter greater than the outer diameter of the cylindrical wheel rim, characterized by the fact that said assembly further comprises at least one solid annular part of elastic material which is mountable between the rim and the rigid ring, the annular part having an outer diameter substantially equal to the inner diameter of the rigid ring and having an inner diameter and width such that after the tire has been mounted on the rim, the fastening of said assembly on the rim is assured by compression of the elastic material of the annular part.

2. Support ring assembly according to claim 1, characterized by the fact that the elastic annular part which is mountable between the rim and the rigid ring has an inner diameter slightly less than the outer diameter of the cylindrical wheel rim.

3. Support ring assembly according to claim 1, characterized by the fact that the elastic annular part which is mountable between the rim and the rigid ring has a width greater than the distance between the two beads of the tire after the tire has been mounted on the rim.

4. Support ring assembly accodng to claim 1, characterized by the fact that the radially inner cylindrical surface of the rigid ring has a circumferential groove into which the elastic annular part engages under the effect of its compression.

5. Support ring assembly according to claim 1, characterized by the fact that the elastic annular part has an enlarged outer diameter in at least one of its side portions located laterally beyond the rigid ring after mounting on the rim.

6. Support ring assembly according to claim 1, characterized by the fact that said assembly comprises two similar elastic annular parts mounted one alongside the other with the provision of a circular cavity between them.

* * * * *